(12) United States Patent
Wang et al.

(10) Patent No.: US 9,341,880 B2
(45) Date of Patent: *May 17, 2016

(54) LIQUID CRYSTAL DISPLAY PANEL AND DRIVING METHOD THEREOF, AND DISPLAY DEVICE

(71) Applicant: BOE TECHNOLOGY GROUP CO., LTD., Beijing (CN)

(72) Inventors: Qiangtao Wang, Beijing (CN); Hyunsic Choi, Beijing (CN); Zheng Fang, Beijing (CN); Yoonsung Um, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/395,650

(22) PCT Filed: Dec. 25, 2013

(86) PCT No.: PCT/CN2013/090421
§ 371 (c)(1),
(2) Date: Oct. 20, 2014

(87) PCT Pub. No.: WO2015/018167
PCT Pub. Date: Feb. 12, 2015

(65) Prior Publication Data
US 2015/0309360 A1   Oct. 29, 2015

(30) Foreign Application Priority Data

Aug. 7, 2013   (CN) .......................... 2013 1 0342246

(51) Int. Cl.
*G09G 3/36* (2006.01)
*G02F 1/1335* (2006.01)
*G02F 1/1343* (2006.01)
(Continued)

(52) U.S. Cl.
CPC .... *G02F 1/133514* (2013.01); *G02F 1/133512* (2013.01); *G02F 1/134336* (2013.01);
(Continued)

(58) Field of Classification Search
CPC . G09G 3/2003; G09G 3/3607; G09G 3/3648; G09G 3/3614
USPC .................................................. 345/694, 204
See application file for complete search history.

(56) References Cited

U.S. PATENT DOCUMENTS

| 2008/0061305 | A1 | 3/2008 | Kim et al. | |
| 2008/0084376 | A1* | 4/2008 | Hirota | G09G 3/3607 345/88 |
| 2009/0033845 | A1* | 2/2009 | Tanno | G02F 1/134363 349/106 |

FOREIGN PATENT DOCUMENTS

| CN | 101344670 A | 1/2009 |
| CN | 101359120 A | 2/2009 |

(Continued)

OTHER PUBLICATIONS

Search Report issued in International Application No. PCT/CN2013/090421, fourteen (14) pages.
(Continued)

*Primary Examiner* — Carolyn R Edwards
(74) *Attorney, Agent, or Firm* — Nath, Goldberg & Meyer; Joshua B. Goldberg

(57) ABSTRACT

In a liquid crystal display panel, as the arrangement of the color filters of the sub-pixel units of every two adjacent pixel units in the row direction, from at least one group composed of two adjacent columns of pixel units in the row direction, is changed, the color filters of two adjacent sub-pixel units in the row direction, which belong to different two pixel units, have the same color; position of the data line connected with the sub-pixel units with color filters of the same color is changed, so that the data line is provided at a side of one of the sub-pixel units with color filters of the same color far away from the other one thereof. Therefore, while the color mixing phenomenon is avoided, a part of the black matrix, which should be provided between the two adjacent sub-pixel units in the row direction, may be omitted.

17 Claims, 10 Drawing Sheets

(51) Int. Cl.
*G09G 3/20* (2006.01)
*G02F 1/1362* (2006.01)

(52) U.S. Cl.
CPC ........ *G02F1/136286* (2013.01); *G09G 3/2003* (2013.01); *G09G 3/3607* (2013.01); *G09G 3/3614* (2013.01); *G09G 3/3648* (2013.01); *G02F 2001/134345* (2013.01); *G02F 2201/40* (2013.01); *G09G 2300/08* (2013.01); *G09G 2320/0233* (2013.01)

(56) References Cited

FOREIGN PATENT DOCUMENTS

| CN | 102663965 | A | 9/2012 |
|----|-----------|---|--------|
| CN | 103048836 | A | 4/2013 |
| CN | 103424923 | A | 12/2013 |
| CN | 203365856 | U | 12/2013 |
| JP | H1184365 | A | 3/1999 |
| JP | 2002107709 | A | 4/2002 |
| JP | 2005062220 | A | 3/2005 |

OTHER PUBLICATIONS

Chinese Office Action dated Jun. 2, 2015 issued in corresponding Chinese Application No. 201310342246.2.

Written Opinion of the International Searching Authority dated May 16, 2014 issued in International Application No. PCT/CN2013/090421.

* cited by examiner

LIQUID CRYSTAL DISPLAY PANEL AND DRIVING METHOD THEREOF, AND DISPLAY DEVICE

This is a National Phase Application filed under 35 U.S.C. 371 as a national stage of PCT/CN2013/090421, filed Dec. 25, 2013, and claims priority benefit from Chinese Application No. 201310342246.2, filed Aug. 7, 2013, the content of each of which is hereby incorporated by reference in its entirety.

TECHNICAL FIELD

The present invention relates to the field of display technology, and particularly, to a liquid crystal display panel and a driving method thereof, and a display device.

BACKGROUND ART

A liquid crystal display panel is mainly composed of an array substrate, an opposite substrate and liquid crystal molecules provided between the array substrate and the opposite substrate. The liquid crystal display panel is provided with a plurality of pixel units arranged in a matrix therein, each of the pixel units is composed of three sub-pixel units with color filters of different colors, and generally, the color filters for the three sub-pixel units are R, G and B filters. Specifically, the array substrate is provided with gate lines, data lines, thin film transistors (TFTs) and pixel electrodes thereon. The opposite substrate is provided with a black matrix, color resins (generally, including R, G and B resins) and a common electrode. When the gate line is applied with a scan signal of high level, the TFTs connected with the gate line are turned on, a gray scale signal carried by the data line is applied to the pixel electrodes via the TFTs, thus an electric field is generated between the pixel electrodes and the common electrode to control the liquid crystal molecules to deflect, thereby the liquid crystal molecules modulate the transmitted backlight so that the transmitted backlight may be incident onto the color resins on the opposite substrate in different intensities, the color resins may exhibit light of needed colors due to their different transmittances for light in different spectral bands.

Currently, in order to obtain a wide color gamut and a colorful display of excellent image quality, a common means is to thicken the color resins of the liquid crystal display panel, however, the thickened color resin may cause the light transmission ratios of the sub-pixel units to decrease, which will affect the display brightness of the liquid crystal display panel. While the display brightness of the liquid crystal display panel may be guaranteed by increasing the brightness of the backlight source of the liquid crystal display panel, the backlight source with high brightness may increase the power consumption of the entire liquid crystal module. In addition, the light transmission ratios of the sub-pixel units may be guaranteed by increasing the aperture ratios of the sub-pixel units, however, due to the limitation of the process accuracy of aligning and assembling the cell for the liquid crystal display panel, it is necessary to ensure that the black matrix has a width larger than the light-leaking area of the sub-pixel unit and the process accuracy, which is adverse to improving the aperture ratios of the sub-pixel units. Moreover, with the development of the liquid crystal display device of high resolution, the aperture ratio of the sub-pixel unit is further decreased.

Hence, how to increase the display brightness of the liquid crystal display panel with low power consumption has become a problem to be solved.

SUMMARY

In view of above, the invention provides a liquid crystal display panel and a driving method thereof, and a display device, which can increase the display brightness of the liquid crystal display panel with low power consumption.

An embodiment of the invention provides a liquid crystal display panel which comprises an opposite substrate, an array substrate and a liquid crystal layer provided between the array substrate and the opposite substrate, and comprises a plurality of pixel units arranged in a matrix, each of the pixel units is composed of three sub-pixel units with color filters of different colors, wherein the plurality of pixel units are divided into groups, each of which includes two adjacent columns of pixel units in a row direction, wherein each column includes one or more adjacent pixel units in a column direction and there is no pixel unit simultaneously belonging to two groups, and in at least one of the groups, two adjacent sub-pixel units in the row direction in every two adjacent pixel units in the row direction have color filters of the same color, and the two sub-pixels in the row direction with the color filters of the same color belong to different pixel units, the adjacent sub-pixel units in the adjacent pixel units in the row direction in each group form two columns of sub-pixel units, a data line for supplying a gray scale signal for one column of the two columns of sub-pixel units is provided at a side of the one column of sub-pixel units far away from the other column of the two columns of sub-pixel units; and a black matrix with a plurality of opening areas is provided on a side of the opposite substrate or the array substrate facing to the liquid crystal layer, wherein every two adjacent sub-pixel units in the row direction correspond to the same opening area.

In the above liquid crystal display panel in the invention, as the arrangement of the color filters of the sub-pixel units of every two adjacent sub-pixel units in the row direction, from the at least one group composed of two adjacent columns of pixel units in the row direction, is changed, so that the color filters of two adjacent sub-pixel units in the row direction, which belong to different two pixel units, have the same color. Moreover, position of the data line connected with the sub-pixel units with color filters of the same color is changed, so that the data line is provided at a side of one of the sub-pixel units with color filters of the same color far away from the other one thereof. Therefore, while the color mixing phenomenon is avoided, a part of the black matrix, which should be provided between the two adjacent sub-pixel units in the row direction, may be omitted, that is, for the two adjacent sub-pixel units in the row direction, only one opening area may be provided in the pattern of black matrix. The aperture ratio of the sub-pixel units can be increased by decreasing area of the pattern of the black matrix, the light transmission ratio of each sub-pixel unit is increased accordingly, thus the display brightness of the liquid crystal display panel is improved. In addition, as no color mixing phenomenon occurs between the two adjacent sub-pixel units in the row direction with color filters of the same color, distances between pixel electrodes thereof can be reduced, thereby the amount of the liquid crystals to be driven by the pixel electrodes can be increased, and the operation efficiency of the liquid crystal display device can be increased.

Furthermore, in the liquid crystal display panel, the plurality of pixel units are divided into sets, each of which includes two adjacent rows of pixel units in a column direction, wherein each row includes one or more adjacent pixel units in the row direction and there is no pixel unit simultaneously belonging to two sets, and in at least one of the sets, two adjacent sub-pixel units in the column direction of every two adjacent pixel units in the column direction have color filters of the same color, and the two adjacent sub-pixels in the column direction with the color filters of the same color belong to different pixel units, the adjacent sub-pixel units in the column direction of the adjacent pixel units in the column direction in each set form two rows of sub-pixel units, a gate line for supplying a scan signal for one of the two rows of sub-pixel units is provided at a side of the one row of sub-pixel units far away from the other one of the two rows of sub-pixel units.

Preferably, in order to further improve the display brightness of the liquid crystal display panel, in the liquid crystal display panel, every two adjacent sub-pixel units in the column direction correspond to the same opening area.

Specifically, in the liquid crystal display panel in the embodiment of the invention, the three sub-pixel units in each pixel unit are arranged in the row direction.

Preferably, when the three sub-pixel units in the pixel unit are arranged in the row direction, in order to decrease area of the pattern of the black matrix corresponding to the data lines at most to improve the display brightness of the liquid crystal display panel, in each group composed of two adjacent columns of pixel units in the row direction, two adjacent sub-pixel units in the row direction of every two adjacent pixel units in the row direction have color filters of the same color, and the two adjacent sub-pixels in the row direction with the color filters of the same color belong to different pixel units.

Furthermore, when the three sub-pixel units in the pixel unit are arranged in the row direction, in order to decrease area of the pattern of the black matrix corresponding to the gate lines at most to improve the display brightness of the liquid crystal display panel, in each set composed of two adjacent rows of pixel units in the column direction, two adjacent sub-pixel units in the column direction of every the two adjacent pixel units in the column direction have color filters of the same color.

Specifically, in the liquid crystal display panel in the embodiment of the invention, the three sub-pixel units in each pixel unit are arranged in the column direction.

Preferably, when the three sub-pixel units in the pixel unit are arranged in the column direction, in order to decrease area of the pattern of the black matrix corresponding to the data lines at most to improve the display brightness of the liquid crystal display panel, in each group composed of two adjacent columns of pixel units in the row direction, two adjacent sub-pixel units in the row direction of every two adjacent pixel units in the row direction have color filters of the same color.

Furthermore, when the three sub-pixel units in the pixel unit are arranged in the column direction, in order to decrease area of the pattern of the black matrix corresponding to the data lines at most to improve the display brightness of the liquid crystal display panel, in each set composed of two adjacent rows of pixel units in the column direction, two adjacent sub-pixel units in the column direction of every two adjacent pixel units in the column direction have color filters of the same color, and the two sub-pixels in the column direction with the color filters of the same color belong to different pixel units.

An embodiment of the invention also provides a display device comprising the above liquid crystal display panel.

With respect to the embodiments of the above liquid crystal display panel in the invention, the invention provides a driving method of the liquid crystal display panel comprising:

in a time period for displaying a frame of image, applying gray scale signals with the same polarity to two columns of sub-pixel units including two adjacent sub-pixel units in the row direction with the color filters of the same color;

applying gray scale signals with the same polarity to two columns of sub-pixel units with two data lines provided therebetween; and applying gray scale signals with the opposite polarities to two columns of sub-pixel units with only one data line provided therebetween.

The invention provides a driving method of the liquid crystal display panel, wherein three sub-pixel units in each pixel unit are arranged in the column direction, the driving method comprises:

in a time period for displaying a frame of image, applying gray scale signals with the same polarity to two columns of sub-pixel units including two adjacent sub-pixel units in the row direction with the color filters of the same color; and applying gray scale signals with the opposite polarities to two columns of sub-pixel units with two data lines provided therebetween.

DETAILED DESCRIPTION OF THE PREFERRED EMBODIMENTS

Figure 1:
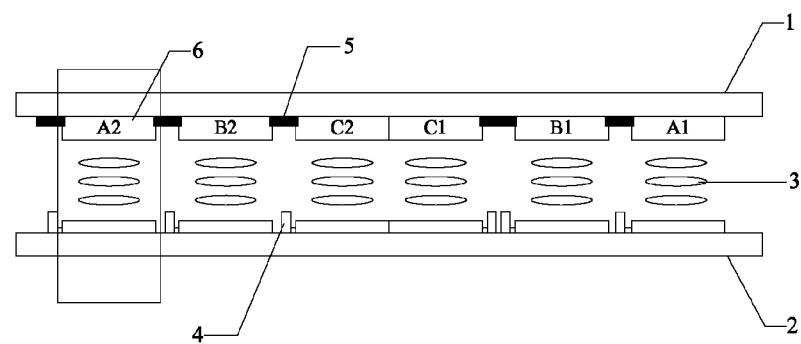
FIG. 1 is a structural diagram of a liquid crystal display panel in an embodiment of the invention.

Hereinafter, embodiments of the liquid crystal display panel and the driving method thereof, and the display device will be described in conjunction with the drawings.

Shapes and thicknesses of film layers in the drawings do not reflect the real scales of the array substrate or the opposite substrate, and they are intended to just illustrate the invention.

An embodiment of the invention provides a liquid crystal display panel, as shown in FIG. 1, which comprises an opposite substrate 1, an array substrate 2 and a liquid crystal layer 3 provided between the array substrate 2 and the opposite substrate 1. The liquid crystal display panel has a plurality of pixel units arranged in a matrix (FIG. 1 shows two pixel units, that is a pixel unit composed of A1, B1 and C1 sub-pixel units, and a pixel unit composed of A2, B2 and C2 sub-pixel units), each of the pixel units is composed of three sub-pixel units with color filters of different colors, as indicated by a dotted line frame in FIG. 1. In FIG. 1, the sub-pixel units composing each of the pixel units are represented by A1, B1, C1 and A2, B2, C2, wherein A1 and A2, B1 and B2, and C1 and C2 may represent any one color of R, G and B.

Figure 2:
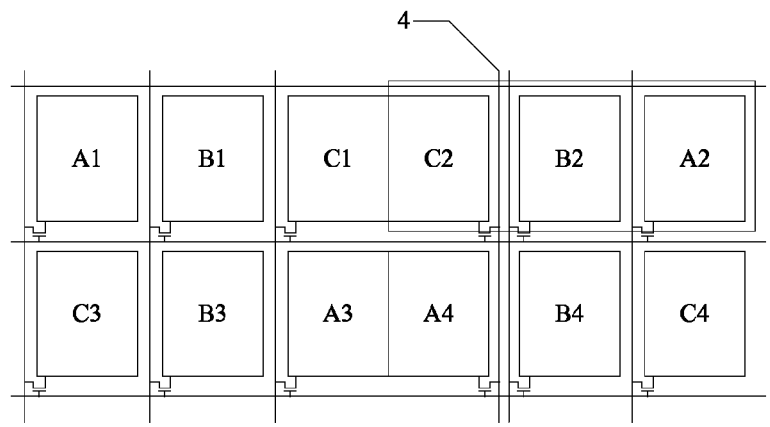
FIG. 2 is a first structural diagram of an array substrate in the liquid crystal display panel in an embodiment of the invention.

FIG. 2 is a top view of the array substrate 2, the pixel units are grouped so that each group is composed of two columns of pixel units which are adjacent in the row direction, as shown in FIG. 2, the dotted line frame represents a pixel unit, and one group may be just composed of two adjacent pixel units in the same row or two adjacent columns of pixel units in a plurality of adjacent rows, and there is no pixel unit simultaneously belonging to two groups. In at least one of the groups, two adjacent sub-pixel units in every two adjacent pixel units in the row direction (C1 and C2, A3 and A4) have color filters of the same color, and the two sub-pixels C1 and C2, A3 and A4 with the color filters of the same color, which are adjacent in the row direction, belong to different pixel units. The adjacent sub-pixel units in the adjacent pixel units in the row direction in each group form two columns of sub-pixel units, a data line 4 for supplying a gray scale signal for one column of the two columns of sub-pixel units is provided at a side of the one column of sub-pixel units far away from the other column of the two columns of sub-pixel units, that is, no data line is provided between C1 and C2 and between A3 and A4, but two data lines 4 are provided between B2 and C2 and between A4 and B4.

Figure 3:
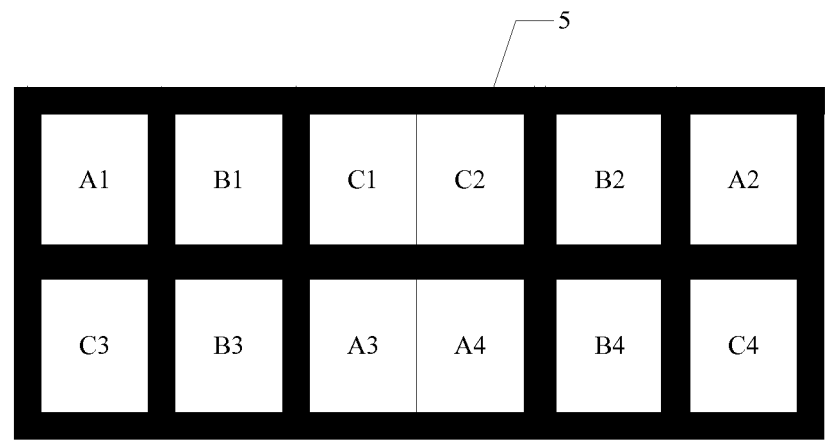
FIG. 3 is a first structural diagram of an opposite substrate in the liquid crystal display panel in an embodiment of the invention.

A black matrix 5 with a plurality of opening areas is provided on a side of the opposite substrate 1 or the array substrate 2 facing to the liquid crystal layer 3, wherein the opening areas correspond to the sub-pixel units. However, in the invention, as shown in FIG. 3, one opening area is provided to correspond to two adjacent sub-pixel units C1 and C2 in the row direction and one opening area is provided to correspond to two adjacent sub-pixel units A3 and A4 in the row direction, in the pattern of the black matrix 5, that is, no pattern of the black matrix 5 is provided between C1 and C2 and between A3 and A4.

Figure 4:
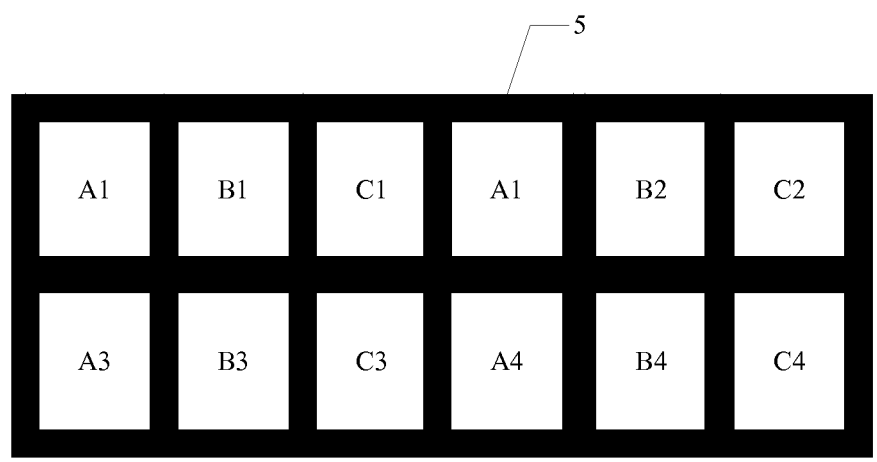
FIG. 4 is a structural diagram of the opposite substrate in the liquid crystal display panel in the prior art.

In the liquid crystal display panel of the invention, as the arrangement of the color filters of the sub-pixel units in two adjacent pixel units in the row direction, from at least one group composed of two adjacent columns of pixel units in the row direction, is changed, so that the color filters of two adjacent sub-pixel units C1 and C2, A3 and A4 in the row direction, which belong to two different pixel units, have the same color. Moreover, position of the data line 4 connected with the sub-pixel units with color filters of the same color C1 and C2, A3 and A4 is changed, so that the data line 4 is provided at the side far away from the gap between the sub-pixel units with color filters of the same color C1 and C2, A3 and A4, for example, the data line 4 for the sub-pixel units C2 and A4 is provided between the sub-pixel units C2 and B2 and between the sub-pixel units A4 and B4. Therefore, while the color mixing phenomenon is avoided, the part of the black matrix 5, which should be provided between the two adjacent sub-pixel units in the row direction, may be omitted, that is, for the two adjacent sub-pixel units in the row direction, only one opening area may be provided in the pattern of black matrix 5. Compared to the arrangement of the sub-pixel units of pixel units and the pattern of the black matrix 5 shown in FIG. 4 in the prior art, in the invention, the aperture ratio of the sub-pixel units can be increased by decreasing area of the pattern of the black matrix 5, the light transmission ratio of each sub-pixel unit is increased accordingly, thus the display brightness of the liquid crystal display panel is improved. In addition, as no color mixing phenomenon occurs between the two adjacent sub-pixel units in the row direction with color filters of the same color C1 and C2, and A3 and A4 respectively, distances between pixel electrodes thereof can be reduced, thereby the mount of the liquid crystals to be driven by the pixel electrodes can be increased, and the operation efficiency of the liquid crystal display device can be increased.

In specifically implementing the liquid crystal display panel in the embodiment of the invention, color resins 6 deciding colors of the color filters for the sub-pixel units, as shown in FIG. 1, may be provided at a side of the opposite substrate 1 facing to the liquid crystal layer 3, or may be provided at a side of the array substrate 2 facing to the opposite substrate 1, and which will not be limited herein. In addition, in specifically implementing the liquid crystal display panel in the embodiment of the invention, when one opening area of the pattern of the black matrix corresponds to a plurality of sub-pixel units with color filters of the same color, color resins corresponding to these sub-pixel units may be provided separately, or may be provided as a whole, which will not be limited herein.

The black matrix 5 is used to shield the data lines and the gate lines so as to avoid light leakage and color mixing phenomenon, as shown in FIG. 1, the black matrix 5 may be provided at a side of the opposite substrate 1 facing to the liquid crystal layer 3, or at a side of the array substrate 2 facing to the opposite substrate 1, which will not be limited herein.

Figure 5:
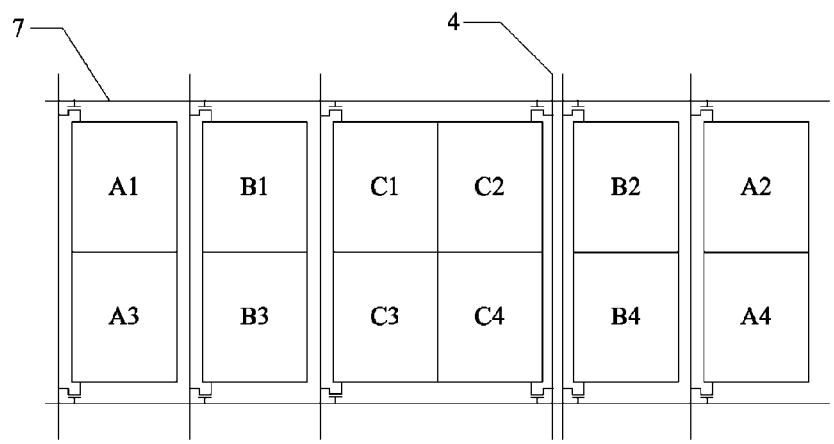
FIG. 5 is a second structural diagram of an array substrate in the liquid crystal display panel in an embodiment of the invention.

Further, in the liquid crystal display panel in the invention, on the basis of changing the positions of the data lines, positions of the gate lines may be changed. Specifically, as shown in FIG. 5, the plurality of pixel units are divided into sets, each of which may be composed of two rows of pixel units in the adjacent columns (one set may be just composed of two adjacent pixel units in the same column or two adjacent rows of pixel units in a plurality of adjacent columns), and there is no pixel unit simultaneously belonging to two sets. In at least one of the sets, two adjacent sub-pixel units in every two adjacent pixel units in the column direction (A1 and A3, B1 and B3, C1 and C3, A2 and A4, B2 and B4, and C2 and C4) have color filters of the same color, and the two adjacent sub-pixels with the color filters of the same color in the column direction (A1 and A3, B1 and B3, C1 and C3, A2 and A4, B2 and B4, and C2 and C4) belong to different pixel units, the adjacent sub-pixel units in the column direction of the adjacent pixel units in the column direction in each set form two rows of sub-pixel units, a gate line 7 for supplying a scan signal for one row of the two rows of sub-pixel units is provided at a side of the one row of sub-pixel units far away from the other row of the two rows of sub-pixel units. That is, no gate line is provided between A1 and A3, B1 and B3, C1 and C3, A2 and A4, B2 and B4, and C2 and C4.

Figure 6:
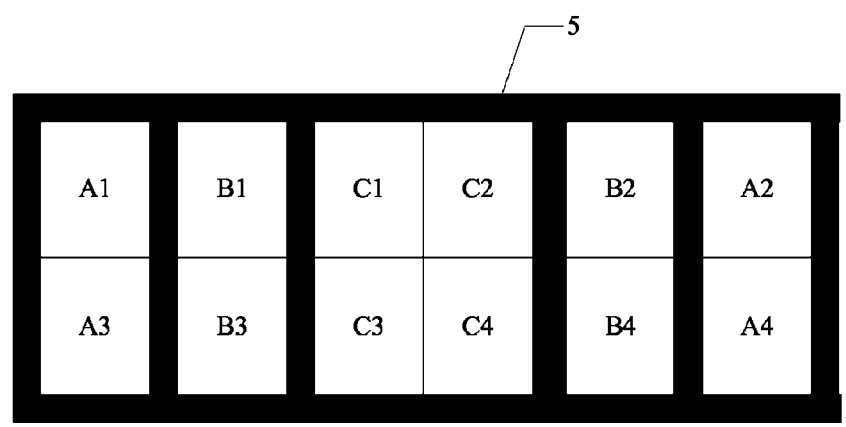
FIG. 6 is a second structural diagram of an opposite substrate in the liquid crystal display panel in an embodiment of the invention.

In the case that the liquid crystal display panel in the invention adopts the structure in FIG. 5, position of the gate line 7 connected with the sub-pixel units with color filters of the same color A1 and A3, B1 and B3, C1 and C3, A2 and A4, B2 and B4, and C2 and C4 is changed, so that while the color mixing phenomenon is avoided, as shown in FIG. 6, a part of the black matrix 5, which should be provided between the two adjacent rows of sub-pixel units in the column direction, may be omitted, that is, for the two adjacent sub-pixel units in the column direction, only one opening area may be provided in the pattern of black matrix 5, for example, one opening area is provided in the pattern of the black matrix 5 for sub-pixel units A1 and A3, thus the aperture ratio of the sub-pixel units can be increased by decreasing area of the pattern of the black matrix 5, the light transmission ratio of each sub-pixel unit is increased accordingly, thus the display brightness of the liquid crystal display panel is improved. In addition, as no color mixing phenomenon occurs between the two adjacent sub-pixel units in the column direction with color filters of the same color A1 and A3, B1 and B3, C1 and C3, A2 and A4, B2 and B4, and C2 and C4, distances between pixel electrodes thereof can be reduced, thereby the amount of the liquid crystals to be driven by the pixel electrodes can be increased, and the operation efficiency of the liquid crystal display device can be increased.

In specifically implementing the liquid crystal display panel in the invention, the three sub-pixel units composing the pixel unit may be either arranged in the row direction of the pixel units or in the column direction of the pixel units, which will not be limited herein.

Hereinafter, through two specific embodiments, the implementation of the liquid crystal display panel in the invention adopting both above manners will be described in detail.

Embodiment 1 three sub-pixel units of each pixel unit are arranged in a row direction of the pixel units.

Figure 7:
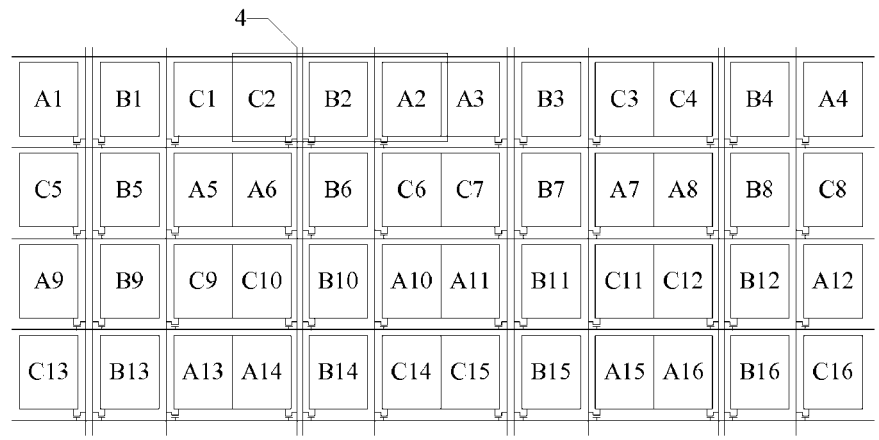
FIG. 7 is a first structural diagram of an array substrate in the liquid crystal display panel in the embodiment 1 of the invention.

Specifically, in the 4×4 pixel units shown in FIG. 7, in every two adjacent columns of pixel units, the colors of the color filters of two adjacent sub-pixel units in the row direction in every two adjacent pixel units in the row direction are provided to be the same, and the two adjacent sub-pixel units in the row direction belong to two different pixel units. For example, in the pixel units in the first column and the second column shown in FIG. 7, the color filters of the sub-pixel units C1 and C2, A5 and A6, C9 and C10, A13 and A14 have the same color, respectively.

The arrangement of the data lines 4 in the array substrate can be optimized at most as follows: the arrangement of the color filters of the adjacent sub-pixel units in the row direction of every two adjacent pixel units in the row direction, from each group composed of two adjacent columns of pixel units in the row direction, is changed, so that the color filters of two adjacent sub-pixel units in the row direction, which belong to two different pixel units, have the same color, and, positions of the data lines 4 connected with the sub-pixel units with color filters of the same color are changed, so that the data lines 4 are provided at sides of the sub-pixel units with color filters of the same color far away from the gaps therebetween.

Figure 8:
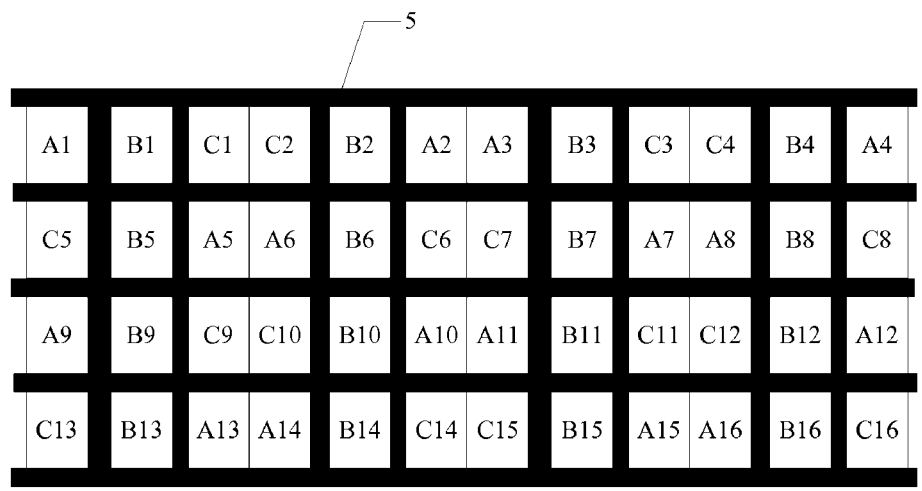
FIG. 8 is a first structural diagram of an opposite substrate in the liquid crystal display panel in the embodiment 1 of the invention.

Corresponding to the structure shown in FIG. 7, FIG. 8 shows a pattern of the black matrix 5, while the color mixing phenomenon is avoided, for two adjacent sub-pixel units in the row direction, only one opening area may be provided in the pattern of black matrix 5, that is, a part of the black matrix 5, which should be provided between the two adjacent sub-pixel units in the row direction with color filters of the same color, may be omitted, for example, as shown in FIG. 8, parts of the pattern of black matrix for gaps between the sub-pixel units C1 and C2, A5 and A6, C9 and C10, A13 and A14 in the first column of pixel units and the second column of pixel units can be omitted.

Figure 9:
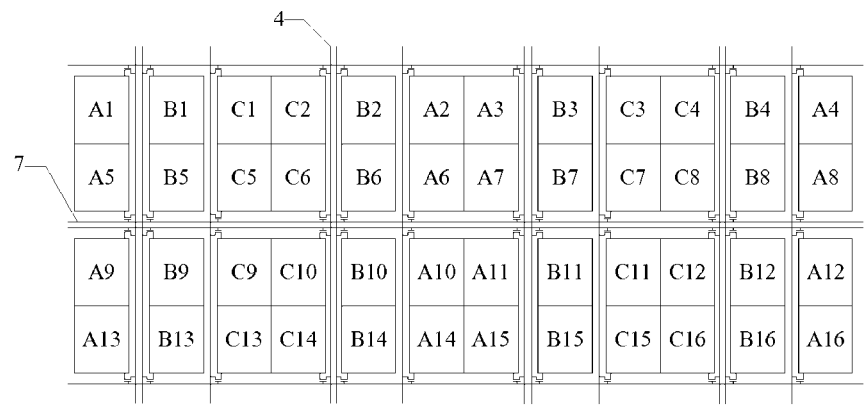
FIG. 9 is a second structural diagram of an array substrate in the liquid crystal display panel in the embodiment 1 of the invention.

Further, on the basis of the structure in FIG. 7, the positions of the gate lines may be changed. As shown in FIG. 9, in each set composed of two adjacent rows of pixel units in the column direction, the color filters of two adjacent sub-pixel units in the column direction in every two adjacent pixel units in the column direction are provided to have the same color, for example, in the first row of pixel units and the second row of pixel units, the colors of the color filters of the sub-pixel units A1 and A5, B1 and B5 . . . A4 and A8 are the same.

The arrangement of the gate lines 7 in the array substrate can be optimized at most as follows: the arrangement of the color filters of the adjacent sub-pixel units in the column direction of every two adjacent pixel units in the column direction, from each set composed of two adjacent rows of pixel units in the column direction, is changed, so that the color filters of two adjacent sub-pixel units in the column direction, which belong to two different pixel units, have the same color, and, positions of the gate lines 7 connected with the sub-pixel units with color filters of the same color are changed, so that the gate lines 7 are provided at sides of the sub-pixel units with color filters of the same color far away from the gaps therebetween.

Figure 10:
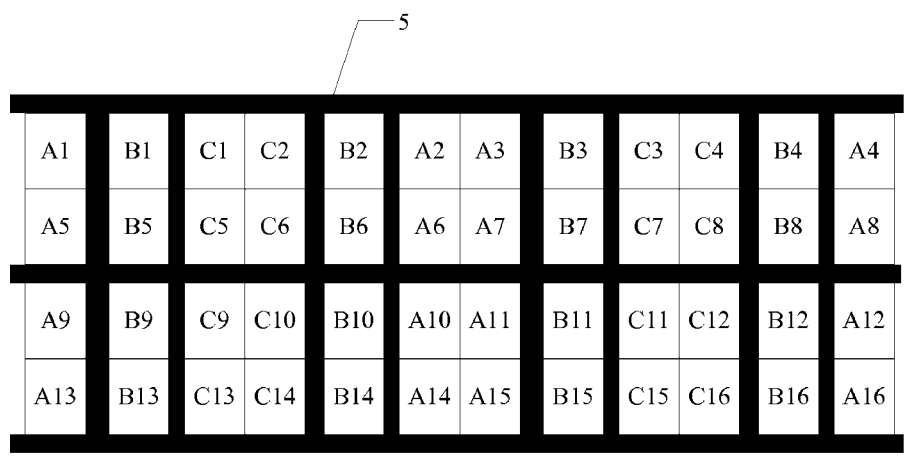
FIG. 10 is a second structural diagram of an opposite substrate in the liquid crystal display panel in the embodiment 1 of the invention.

Corresponding to the structure shown in FIG. 9, FIG. 10 shows a pattern of the black matrix 5, while the color mixing phenomenon is avoided, for two adjacent sub-pixel units in the column direction, only one opening area may be provided in the pattern of black matrix 5, that is, a part of the black matrix 5, which should be provided between the two adjacent sub-pixel units in the column direction with color filters of the same color, may be omitted, for example, as shown in FIG. 10, parts of the pattern of black matrix for gaps between the sub-pixel units A1 and A5, B1 and B5 . . . A4 and A8 in the first row of pixel units and the second row of pixel units can be omitted.

It can be seen from FIG. 10, for four sub-pixel units which are adjacent in the row and column directions, the colors of the color filters of four sub-pixel units C1, C2, C5 and C6 belonging to four different pixel units are the same, thus there is only one opening area in the pattern of the black matrix 5 which corresponds to above four sub-pixel units C1, C2, C5 and C6, thus the aperture ratio of each sub-pixel unit can be increased at most, the light transmission ratio of each sub-pixel unit is increased accordingly, thus the display brightness of the liquid crystal display panel is improved at most. In addition, as no color mixing phenomenon occurs among the four adjacent sub-pixel units C1, C2, C5 and C6, distances between pixel electrodes thereof can be reduced, thereby the amount of the liquid crystals to be driven by the pixel electrodes can be increased, and the operation efficiency of the liquid crystal display device can be increased.

Embodiment 2 three sub-pixel units of each pixel unit are arranged in a column direction of the pixel units.

Figure 11:
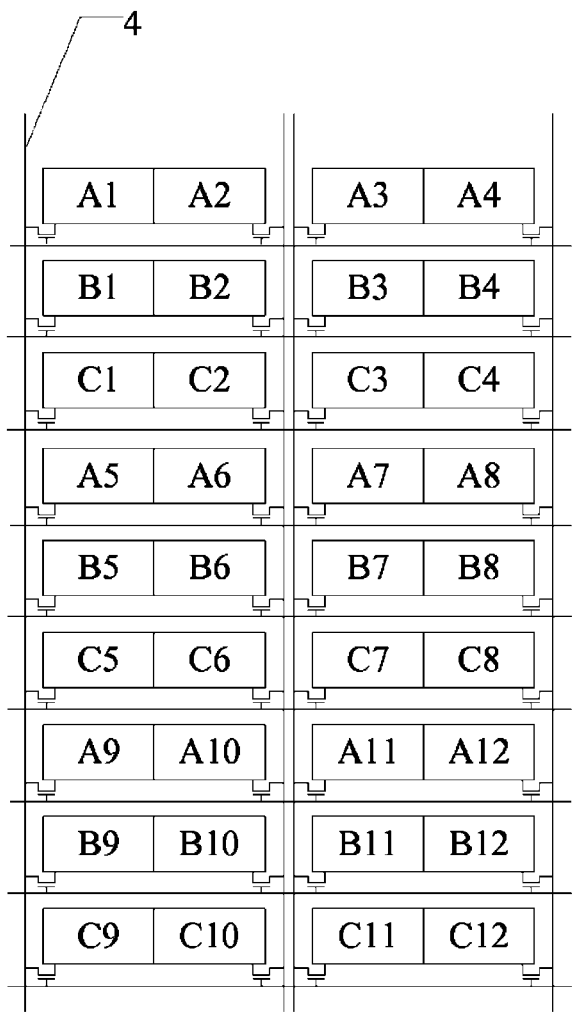
FIG. 11 is a first structural diagram of an array substrate in the liquid crystal display panel in the embodiment 2 of the invention.

Specifically, in the 3×4 pixel units shown in FIG. 11, in each group composed of two adjacent columns of pixel units in the row direction, the colors of the color filters of two adjacent sub-pixel units in the row direction in every two adjacent pixel units in the row direction are provided to be the same. For example, in the pixel units in the first column and the second column as shown in FIG. 11, the color filters of the sub-pixel units A1 and A2, B1 and B2 . . . C9 and C10 have the same color, respectively.

The arrangement of the data lines 4 in the array substrate can be optimized at most as follows: the arrangement of the color filters of the adjacent sub-pixel units in the row direction of every two adjacent pixel units in the row direction, from each group composed of two adjacent columns of pixel units in the row direction, is changed, so that the color filters of two adjacent sub-pixel units in the row direction, which belong to two different pixel units, have the same color, and, positions of the data lines 4 connected with the sub-pixel units with color filters of the same color are changed, so that the data lines 4 are provided at sides of the sub-pixel units with color filters of the same color far away from the gaps therebetween.

Figure 12:
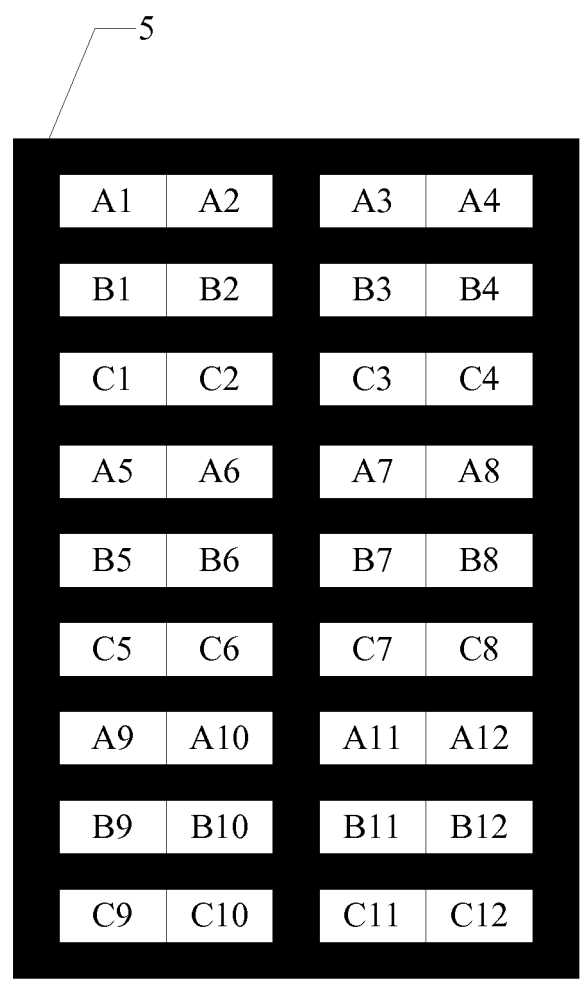
FIG. 12 is a first structural diagram of an opposite substrate in the liquid crystal display panel in the embodiment 2 of the invention.

Corresponding to the structure shown in FIG. 11, FIG. 12 shows a pattern of the black matrix 5, while the color mixing phenomenon is avoided, for two adjacent sub-pixel units in the row direction, only one opening area may be provided in the pattern of black matrix 5, that is, a part of the black matrix 5, which should be provided between the two adjacent sub-pixel units in the row direction with color filters of the same color, may be omitted, for example, as shown in FIG. 12, parts of the pattern of the black matrix for gaps between the sub-pixel units A1 and A2, B1 and B2 . . . C9 and C10 in the first column of pixel units and the second column of pixel units can be omitted.

Figure 13:
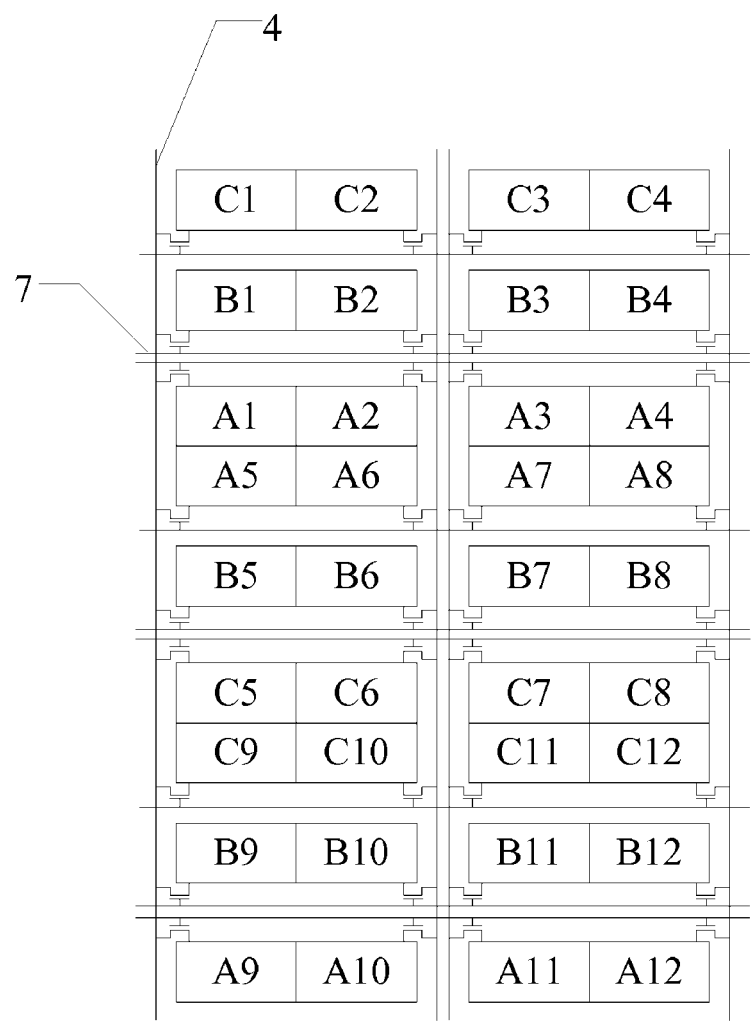
FIG. 13 is a second structural diagram of the array substrate in the liquid crystal display panel in the embodiment 2 of the invention.

Further, on the basis of the structure in FIG. 11, the positions of the gate lines may be changed. As shown in FIG. 13, in each group composed of two adjacent rows of pixel units in the column direction, the color filters of two adjacent sub-pixel units in the column direction in every two adjacent pixel units in the column direction are provided to have the same color and the two adjacent sub-pixel units in the column direction with color filters of the same color belong to two different pixel units, for example, in the first row of pixel units and the second row of pixel units shown in FIG. 13, the colors of the color filters of the sub-pixel units A1 and A5, A2 and A6, A3 and A7, A4 and A8 are the same respectively.

The arrangement of the gate lines 7 in the array substrate can be optimized at most as follows: the arrangement of the color filters of the adjacent sub-pixel units in the column direction of every two pixel units in the column direction, from each set composed of two adjacent rows of pixel units in the column direction, is changed, so that the color filters of two adjacent sub-pixel units in the column direction, which belong to two different pixel units, have the same color, and, positions of the gate lines 7 connected with the sub-pixel units with color filters of the same color are changed, so that the gate lines 7 are provided at sides of the sub-pixel units with color filters of the same color far away from the gaps therebetween.

Figure 14:
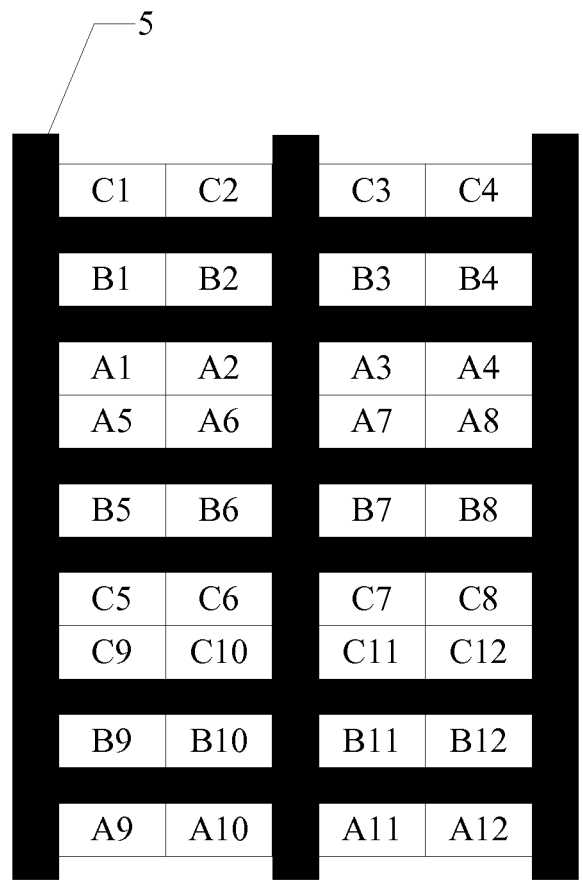
FIG. 14 is a second structural diagram of the opposite substrate in the liquid crystal display panel in the embodiment 2 of the invention.

Corresponding to the structure shown in FIG. 13, FIG. 14 shows a pattern of the black matrix 5, while the color mixing phenomenon is avoided, for two adjacent sub-pixel units in the column direction, only one opening area may be provided in the pattern of black matrix 5, that is, a part of the black matrix 5, which should be provided between the two adjacent sub-pixel units in the column direction with color filters of the same color, may be omitted, for example, as shown in FIG. 14, parts of the pattern of the black matrix for gaps between the sub-pixel units A1 and A5, A2 and A6, A3 and A7, A4 and A8 in the first row of pixel units and the second row of pixel units can be omitted.

It can seen from FIG. 14, for four sub-pixel units which are adjacent in the row and column directions, the colors of the color filters of four sub-pixel units A1, A2, A5 and A6 belonging to four different pixel units are the same, thus there is only one opening area in the pattern of the black matrix 5 which corresponds to above four sub-pixel units A1, A2, A5 and A6, thus the aperture ratio of each sub-pixel unit can be increased at most, the light transmission ratio of each sub-pixel unit is increased accordingly, thus the display brightness of the liquid crystal display panel is improved at most. In addition, as no color mixing phenomenon occurs among the four adjacent sub-pixel units A1, A2, A5 and A6, distances between pixel electrodes thereof can be reduced, thereby the amount of the liquid crystals to be driven by the pixel electrodes can be increased, and the operation efficiency of the liquid crystal display device can be increased.

Accordingly, an embodiment of the invention provides a driving method of the above liquid crystal display panel, the driving method comprises:

in a time period for displaying a frame of image, applying the same gray scale signal to two columns of sub-pixel units including two adjacent sub-pixel units in the row direction with the color filters of the same color;

applying gray scale signals with the same polarity to two columns of sub-pixel units with two data lines provided therebetween; and applying gray scale signals with the opposite polarities to two columns of sub-pixel units with only one data line provided therebetween.

When the driving method is applied to the liquid crystal display panel of the invention, as in the liquid crystal display panel, the data lines connected with two columns of sub-pixel units composed of every two adjacent sub-pixel units in the row direction with color filters of the same color are provided at sides of the two columns of sub-pixel units far away from a gap between the two adjacent columns of sub-pixel units, thereby no data line is provided at the gap between the two adjacent columns of sub-pixel units, thus an interval between the two adjacent sub-pixel units in the row direction in the two columns of sub-pixel units is relatively small, which may readily cause signal interference therebetween. Therefore, in a time period for displaying a frame of image, it is necessary to ensure that the polarities of signals applied to two adjacent sub-pixel units in the row direction with color filters of the same color are the same, therefore the signal interference between the two adjacent sub-pixel units in the row direction with a small interval therebetween can be avoided. Taking the arrangement of the sub-pixel units in FIG. 9 as an example, as shown in FIG. 15, the polarities of signals applied to the third and fourth columns of sub-pixel units are the same, the polarities of signals applied to the sixth and seventh columns of sub-pixel units are the same, the polarities of signals applied to the ninth and tenth columns of sub-pixel units are the same, wherein the sub-pixel units applied with signals of the same polarity in FIG. 15 are filled with the same pattern.

Meanwhile, in the liquid crystal display panel in the invention, as there is a case wherein two data lines are provided at a gap between the corresponding sub-pixel units. As shown in FIG. 15, in the case that two data lines are provided at each of four gaps among gaps between the sub-pixel units, as the gray scale signals transmitted in the two data lines at one gap are likely to interfere with each other, therefore, in a time period for displaying a frame of image, it is necessary to ensure that the polarities of the gray scale signals transmitted in two data lines at the same gap between the sub-pixel units are the same, therefore the signal interference between the two data lines can be avoided. As shown in FIG. 15, the polarities of signals applied to the first and second columns of sub-pixel units connected with two data lines provided at a gap therebetween are the same.

Figure 15:
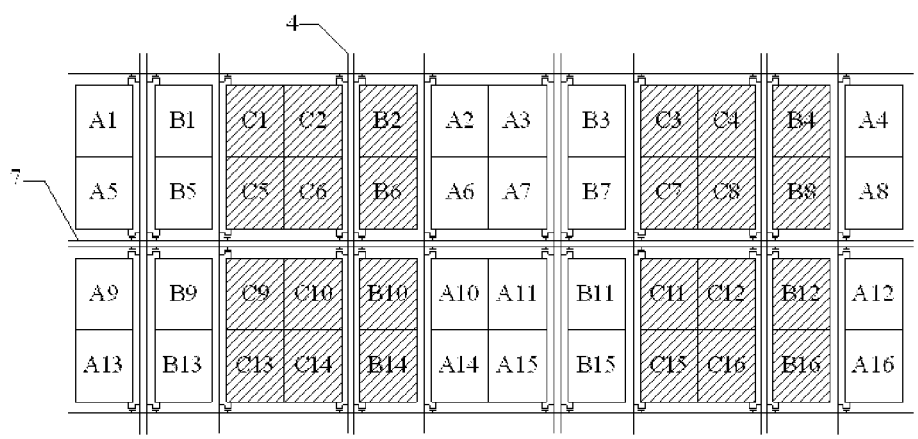
FIG. 15 is a diagram illustrating a case when a driving method of the liquid crystal panel in the embodiment of the invention is applied to the structure in FIG. 9.

On the basis of the above, for example as shown in FIG. 15, there are cases wherein only one data line is provided at a gap between the sub-pixel units, and at this time, in order to realize polarity reversion driving in column of the sub-pixel units in the liquid crystal display panel, in a time period for displaying a frame of image, gray scale signals with opposite polarities may be applied to two columns of sub-pixel units between which there is only one data line, for example, the polarities of signals applied to the second and third columns of sub-pixel units are opposite in FIG. 15.

In addition, for the liquid crystal display panel in the invention wherein three sub-pixel units in the pixel unit are arranged in a column direction of the pixel units, the embodiment of the invention provides a driving method for the liquid crystal display panel, which comprises:

in a time period for displaying a frame of image, applying gray scale signals with the same polarity to two columns of sub-pixel units including two adjacent sub-pixel units in the row direction with the color filters of the same color; and applying gray scale signals with the opposite polarities to two columns of sub-pixel units with two data lines provided therebetween.

When the driving method is applied to the liquid crystal display panel of the invention, as the data lines connected with two columns of sub-pixel units composed of every two adjacent sub-pixel units in the row direction with color filters of the same color are provided at sides of the two columns of sub-pixel units far away from a gap between the two adjacent columns of sub-pixel units, thereby no data line is provided at the gap between the two adjacent columns of sub-pixel units, thus an interval between the two adjacent sub-pixel units in the row direction in the two columns of sub-pixel units is relatively small, which may cause signal interference therebetween. Therefore, in a time period for displaying a frame of image, it is necessary to ensure that the polarities of signals applied to two adjacent sub-pixel units in the row direction with color filters of the same color are the same, therefore the signal interference between the two adjacent sub-pixel units in the row direction can be avoided. Taking the arrangement of the sub-pixel units in FIG. 13 as an example, as shown in FIG. 16, the polarities of signals applied to the first and second columns of sub-pixel units are the same, wherein the sub-pixel units applied with signals of the same polarity in FIG. 16 are filled with the same pattern.

Figure 16:
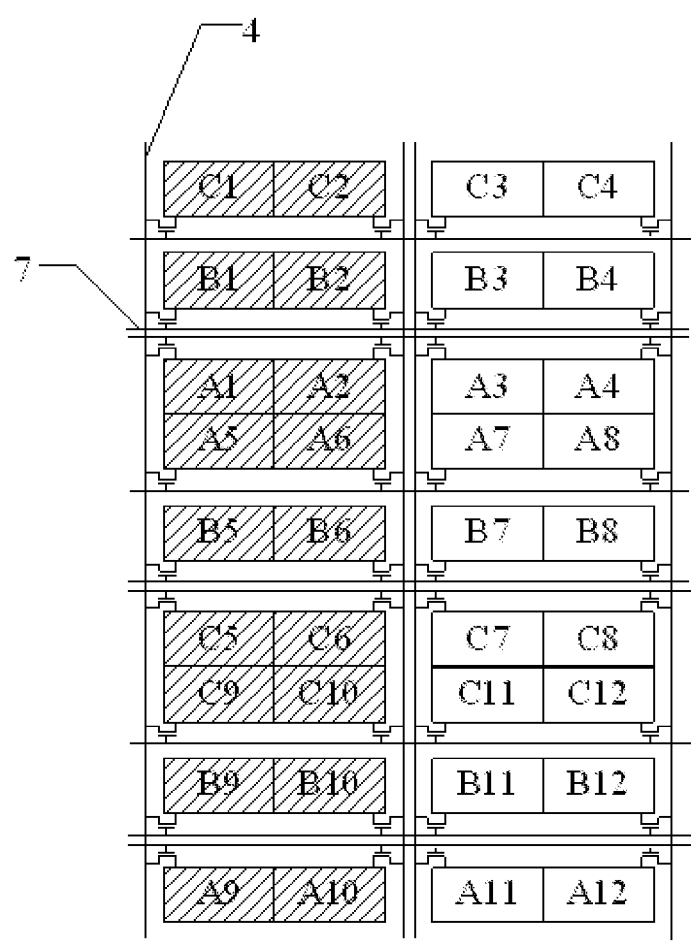
FIG. 16 is a diagram illustrating a case when a driving method of the liquid crystal panel in the embodiment of the invention is applied to the structure in FIG. 13.

At the same time, in order to realize polarity reversion driving in column of the sub-pixel units in the liquid crystal display panel, in a time period for displaying a frame of image, it is necessary to ensure that gray scale signals with opposite polarities are applied to two data lines between the sub-pixel units, for example, the polarities of signals applied to the second and third columns of sub-pixel units are opposite in FIG. 16.

On the basis of the same concept, embodiments of the invention also provide a display device comprising the above liquid crystal display panel in the invention, the display device may be a mobile phone, a pad computer, a television, a display, a notebook computer, a digital image frame, a navigator and any other product or part with displaying function. Embodiments of the display device may be referred to the above embodiments of the liquid crystal display panel, which will not be repeated herein.

In the liquid crystal display panel and the driving method thereof, and the display device in the invention, as the arrangement of the color filters of the sub-pixel units of every two adjacent pixel units in the row direction, from at least one group composed of two adjacent columns of pixel units in the row direction, is changed, so that the color filters of two adjacent sub-pixel units in the row direction, which belong to different two pixel units, have the same color. Moreover, position of the data line connected with the sub-pixel units with color filters of the same color is changed, so that the data line is provided at a side of one of the sub-pixel units with color filters of the same color far away from the other one thereof. Therefore, while the color mixing phenomenon is avoided, the part of the black matrix, which should be provided between the two adjacent sub-pixel units in the row direction, may be omitted, that is, for the two adjacent sub-pixel units in the row direction, only one opening area may be provided in the pattern of black matrix. The aperture ratio of the sub-pixel units can be increased by decreasing area of the pattern of the black matrix, the light transmission ratio of each sub-pixel unit is increased accordingly, thus the display brightness of the liquid crystal display panel is improved. In addition, as no color mixing phenomenon occurs between the two adjacent sub-pixel units in the row direction with color filters of the same color, distances between pixel electrodes thereof can be reduced, thereby the amount of the liquid crystals to be driven by the pixel electrodes can be increased, and the operation efficiency of the liquid crystal display device can be increased.

Obviously, the person skilled in the art can make various variations and modifications without departing from the spirit and scope of the present invention. Therefore, if these variations and modifications belong to the scope of the claims of present invention and the scope of equivalent technical solutions thereof, the invention intends to comprise these variations and modifications.

The invention claimed is:

1. A liquid crystal display panel, which comprises an opposite substrate, an array substrate and a liquid crystal layer provided between the array substrate and the opposite substrate, and comprises a plurality of pixel units arranged in a matrix, each of the pixel units is composed of three sub-pixel units with color filters of different colors, wherein the plurality of pixel units are divided into groups, each of which includes two adjacent columns of pixel units in a row direction, and there is no pixel unit simultaneously belonging to two groups, and in at least one of the groups, two adjacent sub-pixel units in the row direction of every two adjacent pixel units in the row direction have color filters of the same color, and the two adjacent sub-pixels in the row direction with the color filters of the same color belong to different pixel units, the adjacent sub-pixel units in the row direction form two columns of sub-pixel units, a data line for supplying a gray scale signal for one of the two columns of sub-pixel units is provided at a side of the one column of sub-pixel units far away from the other one of the two columns of sub-pixel units;

a black matrix with a plurality of opening areas is provided on a side of the opposite substrate or the array substrate facing to the liquid crystal layer, wherein every two adjacent sub-pixel units in the row direction correspond to the same opening area; and the plurality of pixel units are divided into sets, each of which includes two adjacent rows of pixel units in a column direction, and there is no pixel unit simultaneously belonging to two sets, and in at least one of the sets, every two adjacent sub-pixel units in the column direction of every two adjacent pixel units in the column direction have color filters of the same color, and the two adjacent sub-pixels in the column direction with the color filters of the same color belong to different pixel units, the adjacent sub-pixel units column direction form two rows of sub-pixel units, a gate line for supplying a scan signal for one of the two rows of sub-pixel units is provided at a side of the one row of sub-pixel units far away from the other one of the two rows of sub-pixel units.

2. The liquid crystal display panel of claim 1, wherein every two adjacent sub-pixel units in the column direction correspond to the same opening area.

3. The liquid crystal display panel of claim 2, wherein the three sub-pixel units in each pixel unit are arranged in the row direction.

4. The liquid crystal display panel of claim 3, wherein in each group composed of two adjacent columns of pixel units in the row direction, two adjacent sub-pixel units in the row direction of every two adjacent pixel units in the row direction have color filters of the same color, and the two sub-pixels in the row direction with the color filters of the same color belong to different pixel units.

5. The liquid crystal display panel of claim 4, wherein in each set composed of two adjacent rows of pixel units in the column direction, two adjacent sub-pixel units in the column direction of every two pixel units which are adjacent in the column direction have color filters of the same color.

6. The liquid crystal display panel of claim 2, wherein the three sub-pixel units in each pixel unit are arranged in the column direction.

7. The liquid crystal display panel of claim 6, wherein in each group composed of two adjacent columns of pixel units in the row direction, two adjacent sub-pixel units in the row direction of every two adjacent pixel units in the row direction have color filters of the same color.

8. The liquid crystal display panel of claim 7, wherein in each set composed of two adjacent rows of pixel units in the column direction, two adjacent sub-pixel units in the column direction of every two adjacent pixel units in the column direction have color filters of the same color, and the two sub-pixels in the column direction with the color filters of the same color belong to different pixel units.

9. A display device comprising the liquid crystal display panel of claim 1.

10. The display device of claim 9, wherein every two adjacent sub-pixel units in the column direction correspond to the same opening area.

11. The display device of claim 10, wherein the three sub-pixel units in each pixel unit are arranged in the row direction.

12. The display device of claim 11, wherein in each group composed of two adjacent columns of pixel units in the row direction, two adjacent sub-pixel units in the row direction of every two adjacent pixel units in the row direction have color filters of the same color, and the two sub-pixels in the row direction with the color filters of the same color belong to different pixel units.

13. The display device of claim 12, wherein in each set composed of two adjacent rows of pixel units in the column direction, two adjacent sub-pixel units in the column direction of every two pixel units which are adjacent in the column direction have color filters of the same color.

14. The display device of claim 10, wherein the three sub-pixel units in each pixel unit are arranged in the column direction.

15. The display device of claim 14, wherein in each group composed of two adjacent columns of pixel units in the row direction, two adjacent sub-pixel units in the row direction of every two adjacent pixel units in the row direction have color filters of the same color.

16. The display device of claim 15, wherein in each set composed of two adjacent rows of pixel units in the column direction, two adjacent sub-pixel units in the column direction of every two adjacent pixel units in the column direction have color filters of the same color, and the two sub-pixels in the column direction with the color filters of the same color belong to different pixel units.

17. A driving method for the liquid crystal display panel of claim 1, comprising:
  in a time period for displaying a frame of image, applying gray scale signals with the same polarity to two columns of sub-pixel units including two adjacent sub-pixel units in the row direction with the color filters of the same color;
  applying gray scale signals with the same polarity to two columns of sub-pixel units with two data lines provided therebetween; and
  applying gray scale signals with the opposite polarities to two columns of sub-pixel units with one data line provided therebetween.

* * * * *